(12) United States Patent
Patterson et al.

(10) Patent No.: US 10,866,742 B1
(45) Date of Patent: Dec. 15, 2020

(54) ARCHIVING STORAGE VOLUME SNAPSHOTS

(71) Applicant: NexGen Storage, Inc., Louisville, CO (US)

(72) Inventors: John A. Patterson, Niwot, CO (US); Sebastian P. Sobolewski, Broomfield, CO (US)

(73) Assignee: NEXGEN STORAGE, INC., Louisville, CO (US)

( * ) Notice: Subject to any disclaimer, the term of this patent is extended or adjusted under 35 U.S.C. 154(b) by 0 days.

(21) Appl. No.: 14/818,298

(22) Filed: Aug. 4, 2015

Related U.S. Application Data

(60) Provisional application No. 62/032,889, filed on Aug. 4, 2014.

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01); *G06F 3/0641* (2013.01)

(58) Field of Classification Search
None
See application file for complete search history.

(56) References Cited

U.S. PATENT DOCUMENTS

| | | | | |
|---|---|---|---|---|
| 5,553,280 A * | 9/1996 | Fortier | ................ | G06F 16/2379 |
| 7,243,207 B1 * | 7/2007 | Prakash | .................. | G06F 16/10 |
| | | | | 711/202 |
| 8,060,473 B1 | 11/2011 | Dhumale et al. | | |
| 8,687,493 B2 * | 4/2014 | Torres | ................ | H04B 7/18582 |
| | | | | 370/235 |
| 2004/0194095 A1 * | 9/2004 | Lumb | ................... | G06F 9/4887 |
| | | | | 718/100 |
| 2006/0149889 A1 | 7/2006 | Sikha | | |
| 2006/0248292 A1 * | 11/2006 | Suresh | .................. | G06F 3/0655 |
| | | | | 711/154 |
| 2007/0185938 A1 * | 8/2007 | Prahlad | ............. | G06F 17/30212 |
| 2008/0115071 A1 | 5/2008 | Fair | | |
| 2010/0332401 A1 * | 12/2010 | Prahlad | ............... | G06F 17/3002 |
| | | | | 705/80 |
| 2011/0131326 A1 * | 6/2011 | Medard | ............... | H04L 67/1097 |
| | | | | 709/225 |
| 2012/0185433 A1 * | 7/2012 | Harris, Jr. | ........... | G06F 11/2066 |
| | | | | 707/623 |

(Continued)

OTHER PUBLICATIONS

IBM Tivoli Storage FlashCopy Manager, pp. 1-6.

*Primary Examiner* — Tracy C. Chan
(74) *Attorney, Agent, or Firm* — Sprinkle IP Law Group

(57) ABSTRACT

Apparatuses, systems, methods, and computer program products are disclosed for archiving storage volume snapshots. An archive module determines at least one snapshot or point in time copy of data. A metadata module determines metadata for restoring a snapshot or point in time copy. A storage module replicates a snapshot or point in time copy and stores the replicated snapshot or point in time copy and metadata to a target storage location, such as one or more data files in a file system of one or more storage devices from a different vendor than a storage device from which the data was copied. In another embodiment, both the ability to archive a storage volume snapshot and restore a previously archived storage volume snapshot is provided.

21 Claims, 6 Drawing Sheets

(56) References Cited

U.S. PATENT DOCUMENTS

| | | | |
|---|---|---|---|
| 2013/0117286 A1* | 5/2013 | Gallant | G06F 3/0614 707/752 |
| 2014/0324774 A1* | 10/2014 | Chen | G06F 17/30215 707/611 |
| 2015/0117199 A1* | 4/2015 | Chinnaiah Sankaran | H04L 47/2433 370/235 |

* cited by examiner

ARCHIVING STORAGE VOLUME SNAPSHOTS

CROSS-REFERENCE TO RELATED APPLICATIONS

This application claims the benefit of U.S. Provisional Patent Application No. 62/032,889 entitled "ARCHIVING STORAGE VOLUME SNAPSHOTS" and filed on Aug. 4, 2014, for John Patterson, et al., which is incorporated herein by reference.

FIELD OF THE INVENTION

The present disclosure, in various embodiments, relates to data backup and more particularly relates to archiving snapshots of storage volumes.

BACKGROUND OF THE INVENTION

Backing up data may refer to the process of copying and storing data to a backup location such that backed-up data may be used to restore the original data if the original data is lost or destroyed. Data backups may be important for individuals and organizations that maintain data-centric systems, high-availability systems, or systems that store sensitive or unique data. Data backups may protect data in circumstances where the consistency of the data is in jeopardy (e.g., a storage device failure). In such circumstances, lost or destroyed data may be recovered and restored using a backed-up version of the data.

SUMMARY OF THE INVENTION

A storage volume snapshot comprises a record of the state of a storage volume at a particular point in time (e.g., a point in time copy). It should be appreciated that a snapshot is a picture of the manner in which data is organized within a storage volume. An example of a series of snapshots can be found in the layer map 290 illustrated in FIG. 5 and the related description thereof in U.S. patent application Ser. No. 13/671,544, which is incorporated herein by reference in its entirety. The archiving of data in a storage volume comprises the copying of data from the storage volume to a backup storage device or devices, i.e., a device or devices other than the device or devices with which the storage volume is associated. As such, the backup storage device or devices provide a structure from which data can be recovered in the event that the device(s) with which the storage volume is associated fail. Typically, the backup storage device or devices is/are remotely located from the device or devices associated with the storage volume. The archiving of a storage volume snapshot comprises the copying of data from the storage volume to the backup storage device or devices according to a snapshot.

Presently, many data storage devices receive data for storage and subsequently process received data such that the data that is actually stored is not identical to the data that was received and/or associate other data/information with the data that is stored. For instance, the storage device may process the received data so as encrypt the data or remove duplicate data (i.e., deduplicate the data). In such situations, the stored data is not identical to the received data. An example of a storage device associating other data/information with the data that is stored is the associating of date/time, quality of service, and/or a volume name with data that is stored. In both cases, metadata is generated. For example, if the received data is encrypted, metadata identifying the encryption algorithm used to encrypt the data may be generated to facilitate subsequent decryption of the data. An example of associating other data with the data that is stored is metadata that associates a data/time with the data. With reference to U.S. patent application Ser. No. 13/671,544, another example of metadata that is associated with data stored by a primary data storage device is the processing of a block data command by the filter stack 132 shown in FIG. 2 and the related description. The processing of a block data command produces metadata that is stored in an input/output block (JOB) that is illustrated in FIGS. 3 and 3A of U.S. Pat. Appl. No. The archiving of a storage volume snapshot for such a data storage device comprising copying the data and the metadata associated with the data from the storage volume to the backup storage device or devices according to the snapshot. The copying of any metadata resulting from the changing of the data relative to the data received by the device (e.g., encryption) allows the data that was actually received to be reconstructed, if needed.

Presently, the archiving of a storage volume snapshot is restricted to a backup storage device or devices (sometimes referred to as a target device or devices) that are capable of storing and processing the data being archived according to the archiving protocol employed by the storage device from which the data is being archived (sometimes referred to as the source device or devices). Typically, this means that a user must use source and target devices produced by the same manufacturer. As such, the user is prevented from using a storage device that is available to the user (e.g., part of the user's computer network) as a backup or target storage device for archiving storage volume snapshots from a source storage device that supports a storage volume when the backup or target storage device does not use the same archiving protocol as the source storage device. In one embodiment, an apparatus is provided that facilitates the use of target storage device for archiving storage volume snapshots from a source device when the target storage device does not use the same archiving protocol as the source storage device. In such situations, the source storage device translates the archiving protocol of the source device into an acceptable format for the storage of the archive on the target device.

Methods are presented for archiving storage volume snapshots. In one embodiment, a method includes identifying a snapshot for data of a storage volume. In a further embodiment, a method includes populating an archive with at least a portion of the snapshot and with metadata for the at least a portion of the snapshot. In some embodiments, metadata allows at least a portion of a snapshot to be restored by a module configured to interpret the metadata. In certain embodiments, a method includes storing an archive at a storage location using an interface of a third-party storage location as part of a replication process.

Apparatuses are presented to archive storage volume snapshots. In one embodiment, an archive module is configured to determine at least one point in time copy of data stored by at least one storage device. A metadata module, in a further embodiment, is configured to determine metadata for restoring a point in time copy. In certain embodiments, a storage module is configured to copy a point in time copy and to one or more storage devices using an interface such that the one or more storage devices may be from a different vendor than at least one storage device from which the data was copied.

An apparatus, in another embodiment, includes means for retrieving metadata from an asynchronous backup of a plurality of snapshots for a storage volume. An asynchronous backup, in one embodiment, is stored in a generic format in a different physical storage location than a storage volume of the asynchronous backup. In certain embodiments, an apparatus includes means for selecting a snapshot from an asynchronous backup based on retrieved metadata in response to a restore event. In a further embodiment, an apparatus includes means for restoring a selected snapshot from an asynchronous backup stored in a different location based on retrieved metadata without copying other snapshots from the different storage location.

Computer program products comprising a computer readable storage medium are presented. In certain embodiments, a computer readable storage medium stores computer usable program code executable to perform operations for archiving storage volume snapshots. In one embodiment, an operation includes creating an archive comprising one or more snapshots for a storage volume and metadata for the one or more snapshots. Metadata, in certain embodiments, comprises a deduplication index for deduplicated data of one or more snapshots. An operation, in some embodiments, includes accessing a deduplication index from metadata of an archive in response to a restore event. In a further embodiment, an operation includes restoring at least part of deduplicated data of one or more snapshots from an archive based on a deduplication index in response to a restore event.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

Figure 1A:
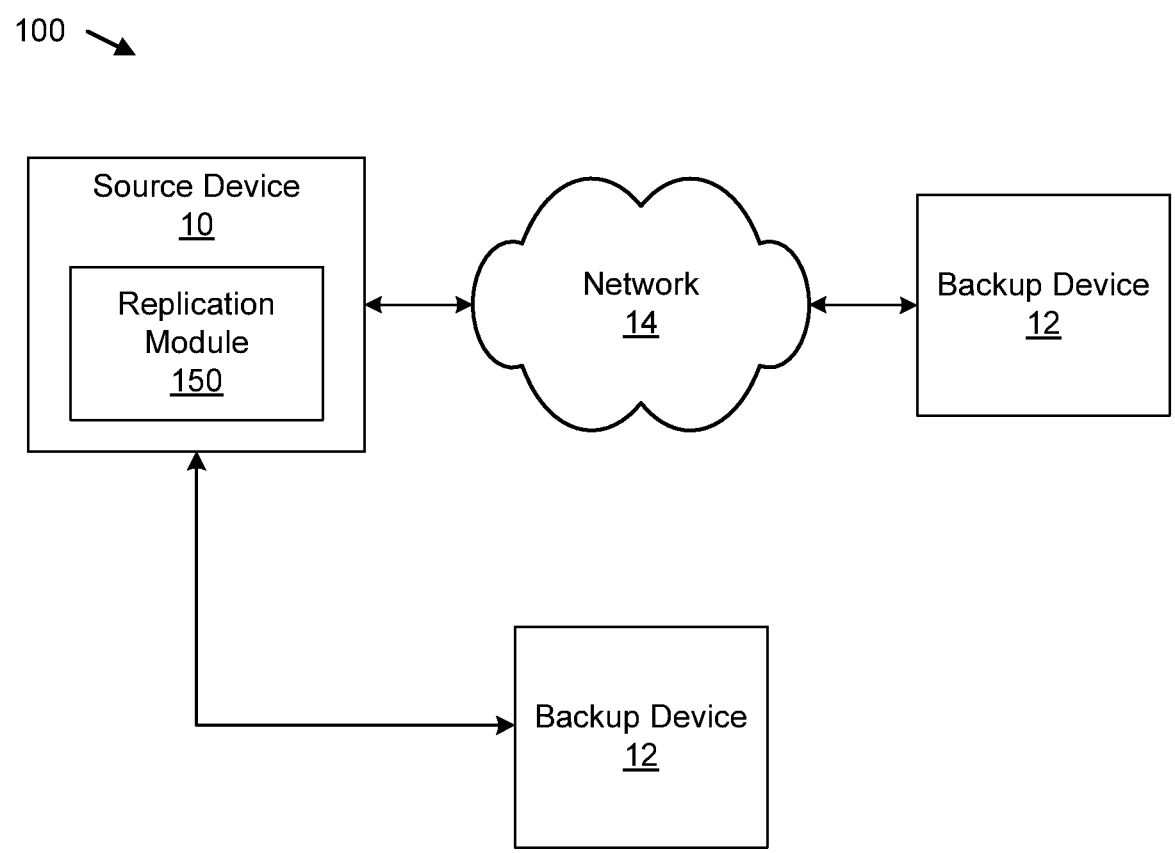
FIG. 1A is a schematic block diagram of one embodiment of a system comprising a replication module.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, may be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1A depicts one embodiment of a system 100 for archiving storage volume snapshots. In the depicted embodiment, the system 100 includes a source device 10, a backup device 12, a network 14, and a replication module 150, which are described in more detail below.

In one embodiment, the source device 10 comprises a computing device, such as a desktop computer, a laptop computer, a server, a virtual server, a smart phone, a tablet computer, a video game system, a set-top box, a smart television, or the like. The source device 10 may further comprise a non-transitory, computer readable storage media. The computer readable storage media may comprise executable instructions configured to cause the source device 10 to perform steps of one or more of the methods disclosed herein. Alternatively, or in addition, the replication module 150 may be embodied as one or more computer readable and/or executable instructions stored on the non-transitory storage media of the source device 10, logic hardware of the source device 10, or the like.

The backup device 12, in one embodiment, comprises a computing device, such as a desktop computer, a laptop computer, a server, a virtual server, a mainframe, or the like. The backup device 12 may comprise a storage device, a storage appliance, a storage client executing on a device, or the like in communication with the source device 10 over the data network 14. The backup device 12 may comprise a non-volatile memory device, a volatile memory, or the like for receiving data of a data transfer from the source device 10.

The data network 14, in certain embodiments, comprises a digital communication network that transmits digital communications related to a system 100 for archiving storage volume snapshots. The data network 14 may include a wireless network, such as a wireless cellular network, a local wireless network, such as a Wi-Fi network, a Bluetooth® network, and the like. The data network 14 may include a wide area network (WAN), a storage area network (SAN), a local area network (LAN), an optical fiber network, the Internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, random access memory (RAM), or the like.

The replication module 150, in one embodiment, is configured to populate an archive with at least a portion of a snapshot for a storage volume. In some embodiments, the replication module 150 is configured to populate the archive with metadata for the portion of the snapshot that populated the archive. In a further embodiment, the replication module 150 is configured to asynchronously store the archive to a volatile and/or non-volatile storage location in a generic format as part of an asynchronous replication process. The replication module 150, in one embodiment, restores at least a portion of the snapshot, which is selected based on the metadata, from the storage location in response to a restore event.

In one embodiment, the replication module 150 allows a snapshot of a storage volume to be stored in an archive that has a generic or standard format so that the archive may be stored on storage devices that have a general, common, or universal storage interface. For example, the archive may be stored on a USB drive, a hard drive, a CD-ROM, or the like, in a generic form. In this manner, the snapshot archive is portable and may be restored on any number of computing devices. Additionally, the replication module 150 allows an entire snapshot, a portion of a snapshot, a plurality of portions of one or more snapshots, or the like, to be restored based on the metadata associated with the snapshots.

In one embodiment, the replication module 150 comprises executable software code, such as a device driver, or the like, stored on the computer readable storage media for execution on the processor. In another embodiment the replication module 150 comprises logic hardware of one or more non-volatile memory devices, such as a non-volatile memory media controller, a non-volatile memory controller, a device controller, a field-programmable gate array (FPGA) or other programmable logic, firmware for an FPGA or other programmable logic, microcode for execution on a microcontroller, an application-specific integrated circuit (ASIC), or the like. In a further embodiment, the replication module 150 may include a combination of both executable software code and logic hardware.

Figure 1B:
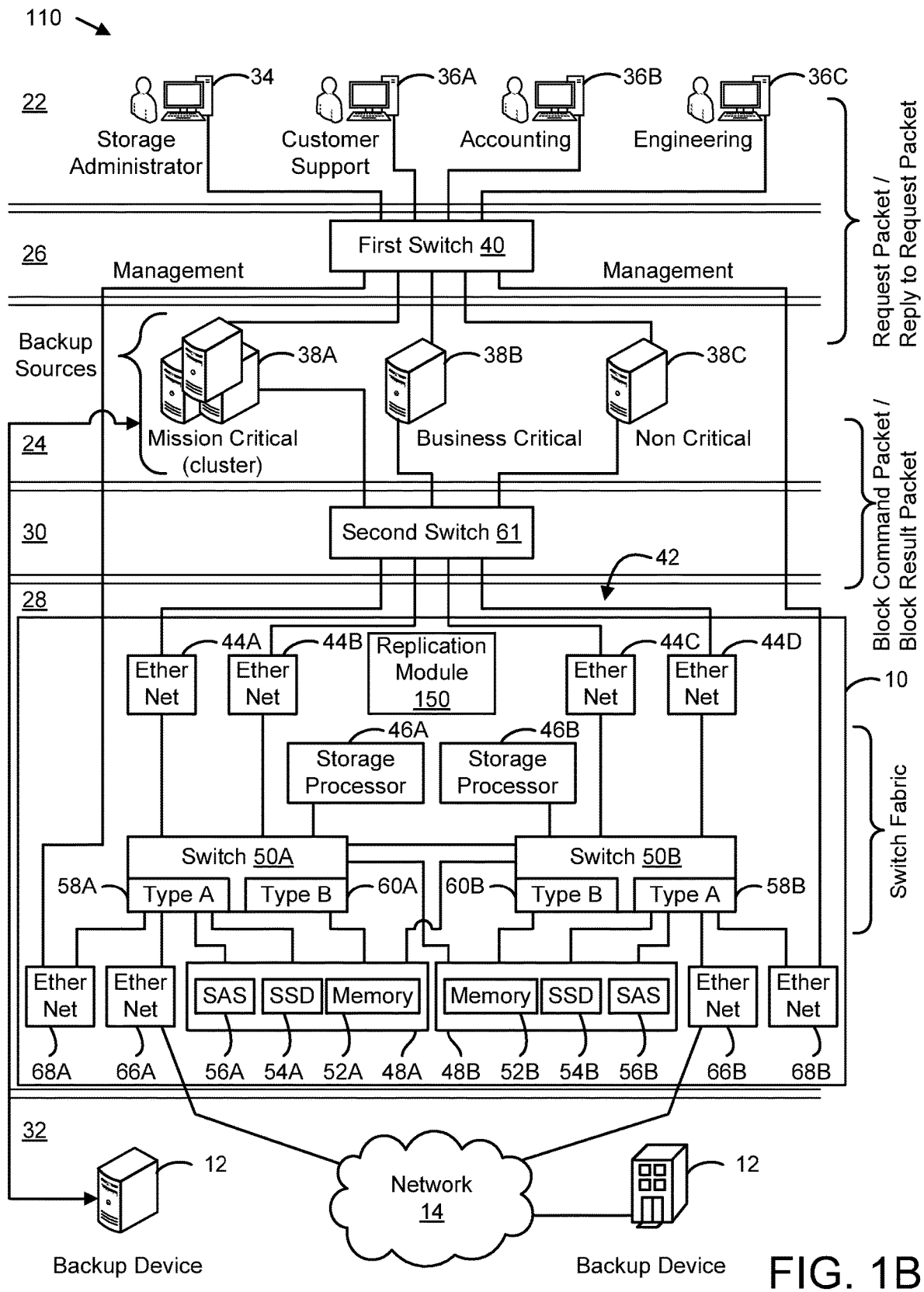
FIG. 1B is a schematic block diagram of one embodiment of another system comprising a replication module.

FIG. 1B depicts one embodiment of another system 110 for archiving storage volume archives. The depicted embodiment includes an embodiment of a primary data storage system. The networked computer system, hereinafter referred to as system 110, includes a user level 22, an initiator level 24, a first switch level 26 that facilitates communication between the user level 22 and the initiator level 24, a primary data storage level 28, a second switch level 30 that facilitates communications between the initiator level 24 and the primary data storage level 28, and a secondary data storage level 32.

A journal in a primary data storage system 28, in one embodiment, is a sequenced list of data operations or storage commands (e.g., write commands, read commands, TRIM commands) that are executed in the order in which the operations were added to the list. In one embodiment, a journal or portion of a journal may be stored in a non-volatile memory medium such as a solid-state storage device 54 or hard disk drive 56. In a further embodiment, a journal or a portion of a journal may be stored in volatile memory 52. In another embodiment, a first portion of a journal may be stored in a non-volatile memory medium such as a solid-state storage device 54 or hard disk drive 56 and a second portion of the journal may be stored in volatile memory 52. In certain embodiments, a page or other portion of a journal may be dynamically paged or loaded from a solid-state storage device 54 into volatile memory 52, for servicing a read request or the like. A journal may comprise a sequential log, a circular log, an append-only log, a change log, a delta log, or other sequenced list. Recording storage commands in a journal, in certain embodiments, allows the storage commands and associated data to be recovered after a power failure, a system crash, or another restart event. An example of a journal and a journal table can be found in FIG. 7 and the related text of U.S. patent application Ser. No. 13/671,544.

The present disclosure is directed to a primary data storage system 28 that includes a journaling processor that dynamically tunes a journal. As such, the journaling processor may assess whether or not to change the current order of operations in a journal. More specifically, this assessment may be based on whether reordering may produce a data space and/or time-speed benefit relative to a particular data store 48. For example, if the assessment reveals that a sequence of operations would require a first amount of time to perform on a particular data store 48 but that reordering the operations such that two operations that were separated from one another by one or more intervening operations now occurred in sequence would require a second amount of time that is less than the first amount of time, the journaling processor may reorder the operations. If there is no or little benefit in reordering the operations, the existing sequence of operations may be maintained.

In one embodiment, the primary data storage system 28 with dynamically tunable journaling is comprised of: (a) one or more i/o ports, each i/o port capable of receiving a packet with a block command and providing a packet with a reply, (b) a data store system having at least one data store 48 capable of receiving and storing data in response to a write block command and/or retrieving and providing data in response to a read block command, and (c) a storage processor 46 with a processor and application memory for executing computer code, the storage processor 46 including a journaling processor for executing computer code related to the sequencing of the processing of block related commands. More specifically, the journaling processor may receive a group of sequenced block commands, analyze the group of sequenced block commands to determine whether the sequence of block commands may be reordered to achieve a data space and/or time-speed benefit relative to the data store, produce a reordered group of block commands if the analysis indicates a data space and/or time-speed benefit may be attained, and add one of: (i) the reordered group of sequenced block commands and (ii) the group of sequenced block commands to a list of block commands to be executed relative to the data store 48. As should be appreciated, the original group of sequenced block commands is added to the list of block commands if the analysis did not reveal a meaningful space and/or time-speed benefit associated with reordering the group of sequenced block commands.

In another embodiment, the data store system 110 may comprise multiple data stores 48 and the journaling processor operates to analyze whether the reordering of block commands for each data store 48 may achieve a data space and/or time-speed benefit relative to the store 48. In another embodiment, the data store system 110 comprises multiple data stores 48 and the journaling processor operates to analyze whether the reordering of block commands for a subset of the multiple data stores 48 may achieve a data space and/or time-speed benefit for each of the data stores 48 in the subset.

For instance, in one embodiment, two commands in a group of commands may be separated from one another by several intervening commands, but these two commands may be executed in less time if the group of commands could be altered so that these two commands would be executed such that one command executes immediately after the other command. This could save time, for example, in reducing the number and/or extent of a seek operation required by a disk drive 56 to or from which data is to be transferred.

While the reordering of commands may provide a benefit, the reordering of commands in a group of commands may also produce different results from the results that would be obtained if the commands were executed in the original time sequence order. For instance, if a group of commands includes a write command that is followed by a read command and both commands relate to the same logical block of data, changing the order of the commands such that the read command precedes the write command would likely produce different results. To elaborate, if the commands are executed in the original time sequence order, the execution of the read command will result in the retrieval of the data that was written in executing the write command. In the reordered sequence, execution of the read command will retrieve whatever data was established in the logical block prior to the execution of the write command, which is likely to be different from the data that execution of the write command will establish in the logical block. As such, in certain embodiments, the primary data storage system 28 may provide the ability to reorder the commands in a group of commands to obtain a benefit associated with the reordering while also providing the ability to obtain the same results as if the commands were executed in the original order. In one embodiment, the ability to reorder a group of commands but obtain results as if the original order of the commands was retained is facilitated using a metadata structure. The extent of the metadata structure that is employed may vary based upon an analysis of the group of the commands potentially being reordered, or the like.

The user level 22 includes at least one user computer that is capable of being used in a manner that interacts with the primary data storage level 28. A user computer is capable of requesting that: (a) data associated with the user computer be sent to the primary data storage level 28 for storage and (b) data stored in the primary data storage level 28 be retrieved and provided to the user computer. At least one user computer associated with the user level is a storage administrator computer 34 that provides a storage administrator or system administrator with the ability to define the manner in which the data storage provided by the primary data storage level 28 is utilized. As illustrated in FIG. 1B, the user level 22 typically includes a plurality of user computers with at least one of the plurality of user computers being associated with a storage administrator and the other user computers being associated with other entities. For the purpose of illustration, the user level 22 includes user computers 36A-36C respectively associated with a customer support department, an accounting department, and an engineering department.

The initiator level 24 includes at least one initiator that operates to translate a request from a user computer into one or more block command packets. A request from a user computer is in the form of a request packet that conforms to a packet protocol such as TCP, IP, Web, DB, and FileShare. A block command packet conforms to a block protocol that includes block commands for data storage devices that operate on one or more blocks of data. Examples of block protocols are the Internet Small Computer System Interface protocol (iSCSI), the Fiber Channel protocol (FC), TCP, and IP. Examples of block commands include: (a) a block write command that directs a data storage device to write one or more blocks of data to storage media associated with the device and (b) a block read command that directs a data storage device to read one or more blocks of data from a storage media associated with the device. A block of data is a fixed and predetermined number of contiguous bytes of data that is or will be resident on some kind of storage media. Typical block sizes are 512, 1024, 2048, and 4096 bytes. For example, a request from a user computer to read a large file of data resident at the primary data storage level 28 is likely to be translated by an initiator into multiple block command packets that each relate to one or more blocks of data that is/are part of the requested file.

The initiator also operates to translate a block result packet, a packet that is received by the initiator and provides the result or a portion of the result of the execution of a block command associated with a block command packet, into a reply to request packet. The initiator provides the reply to the request packet to the appropriate user computer.

As illustrated in FIG. 1B, the initiator level 24 commonly includes a plurality of initiators with each of the initiators capable of: (a) processing request packets from each of the user computers to generate block command packets and (b) processing block result packets to produce reply to request packets that are provided to the appropriate user computers. For the purpose of illustration, the initiator level includes initiators 38A-38C.

An initiator may comprise a cluster of two or more computers that each endeavor to process a request from a user computer and that provide redundancy in the event that one or more of the computers fail. Typically, an initiator that is designated to process high priority or critical requests is comprised of multiple computers, thereby providing redundancy should any one of the computers fail.

The first switch level 26 provides the ability for one or more user computers at the user level 22 to communicate with one or more initiators at the initiator level 24. More specifically, the first switch level 26 operates so as to receive a request packet from a user computer, process the request packet to determine which initiator should receive the request packet, and routes the request packet to the appropriate initiator. Conversely, the first switch level also operates to receive a reply to request packet from the initiator level 24, process the reply to request packet to determine which user computer should receive the reply to request packet, and routes the reply to request packet to the appropriate user computer.

The first switch level 26 may include a single switch that connects one or more user computers to one or more initiators or multiple switches that each connects one or more user computers to one or more initiators. For the purpose of illustration, the first switch level 26 includes a switch 40 that is capable of establishing communication paths between the user computers 34 and 36A-36C and the initiators 38A-38C.

In one embodiment, the source device 10 includes at least a portion of a primary data storage level 28. The primary data storage level 28 (or primary data storage system 28) operates to receive a block command packet from an initiator, attempt to execute the block command contained in the block command packet, produce a block result packet that contains the result of the attempted execution or execution of the block command, and provide the block result packet to the initiator that sent the related block command packet to the primary data storage system 28.

Typical block commands include a write command and a read command. In the case of a write command, the primary data storage system 28 attempts to write one or more blocks of data to a data store (sometimes referred to simply as a "store") associated with the primary data storage system 28. With respect to a read command, the primary data storage system 28 attempts to read one or more blocks of data from a data store associated with the primary data storage system 28 and provide the read data to the initiator.

The primary data storage system 28 includes at least one storage processor and at least one data store. The primary data storage system 28 also includes at least one switch when the at least one storage processor and the at least one data store associated with the at least one storage processor will accommodate two or more independent communication paths between the at least one storage processor and the at least one data store.

A storage processor includes an application memory and a processor for executing code resident in the application memory to process a block command packet. In one embodiment, the processor and the application memory are embodied in a SuperMicro Superserver 6036ST.

A data store is (a) a single data storage device or element or (b) a combination of data storage devices or elements. Examples of a single data storage element that may each be a data store include a CPU bus memory, a disk drive with a magnetic/optical disk, a solid state drive, and a tape drive with a tape. An example of a combination of data storage devices or elements that are configured to operate as a single data store is a group of disk drives configured as a Redundant Array of Independent Drives or RAID.

A data store may be characterized by the attributes of path redundancy, data redundancy, and persistence. The path redundancy attribute is a measure of the number of redundant and independent paths that are available for writing data to and/or reading data from a data store. As such, the value of the path redundancy attribute is the number of independent paths (e.g., the independent I/O ports associated with the data store) less one. The value of the path redundancy attribute is one or greater when there are at least two independent paths available for writing data to and/or reading data from the data store. If there is only one independent path available for writing data to and/or reading from a data store, the path redundancy is zero.

The data redundancy attribute is a measure of the number of failures of elements in a data store that may be tolerated without data loss. As such, the value of the data redundancy attribute is the number of elements in the data store less the number of elements that may fail before there is data loss.

For example, if a data store is comprised of two disk drives (elements) with the data on one disk drive mirroring the data on the other disk drive, the value of the data redundancy attribute is one because the failure of one disk drive means that the data may still be recovered but the failure of both disk drives would mean that there would be data loss. As another example, the value of the data redundancy attribute of a RAID-6 data store comprised of six disk drives (elements) is two because the two of the disk drives (elements) may fail and the data may still be recovered but the failure of three or more disk drives (elements) would preclude the recovery of the data.

The persistence attribute is an indication of: (a) the presence of data on a data store for a substantial period of time without power being applied to the data store or (b) data remaining on a data store for a substantial period of time due to the presence of a primary power source and an independent backup power source that operates in the event of the failure of the primary power source. For example, if a data store is a single magnetic disk drive, the persistence attribute is "positive" because data will remain on the magnetic disk drive for a substantial period of time in the absence of power being applied to the drive. In contrast, a data store that is volatile memory without battery backup has a persistence attribute that is "negative" because data established in the memory will not remain in the memory in the absence of power being applied to the memory.

A data store also provides at least one of a number of possible combinations of read and write operations, including read-only, read and write, write-only, and write-once-read-many (WORM).

The switch facilitates communications between each of the storage processors or a subset of all of the storage processors associated with the primary data storage level 28 and each port of all of the data stores associated with the primary data storage system 28 or a subset thereof.

In certain embodiments, redundancy that allows the primary data storage system 28 to continue operation in the event of a predetermined level of failure of a storage processor, an element of a data store, and or a switch is desired. This redundancy refers to path redundancy in which there are at least two separate and independent paths extending at least part of the way between an I/O interface of the primary data storage system 28, the interface that initially receives a block command packet from an initiator and from which a block result packet is transmitted to an initiator, and a data store.

To provide one embodiment of path redundancy, the primary data storage system 28 includes: (a) an I/O interface 42 comprised of network cards 44A-44D, (b) first and second storage processors 46A, 46B, (c) first and second data store systems 48A, 48B, and (d) first and second switches 50A, 50B. It should be appreciated that storage processors 46A, 46B could each be a single processor or multiple processors operating cohesively.

The network cards 44A-44D (sometimes referred to as "Ethernet cards") of the I/O interface 42 are each addressable by one or more of whatever initiators are operative at the initiator level 24. In the illustrated embodiment, each of the network cards 44A-44D is an Ethernet card that is appropriate for use when all of the initiators that are active at the initiator level 24 are conducting communications with the primary data storage system 28 pursuant to the Ethernet protocol. Other cards may be employed if a different protocol, such as Fibre Channel, is used by the initiators.

The first and second data store systems 48A, 48B are each comprised of a portion of a data store, a portion of each of multiple data stores, a data store, multiple data stores, or combinations thereof.

The first and second switches 50A, 50B each provide at least a portion of the ability to connect (a) one or more of the network cards 44A-44D to a selected one of the storage processors 46A, 46B, (b) first and second storage processors 46A, 46B to one another, and (c) a selected one of the storage processors 46A, 46B to a selected one of the first and second data store systems 48A, 48B. The ability of switch 50A to establish a connection to a store in the data store system 48B depends on the store having at least one of two input/output ports available for establishing a connection with the switch. Similarly, the ability of switch 50B to establish a connection to a store in the data store system 48A depends on the store having one or at least two input/output ports available for establishing a connection with the switch.

The path redundancy that is provided by the embodiment of the primary data storage system 28 shown in FIG. 1B contemplates the failure of: (a) one or more but less than all of the Ethernet cards 44A-44D, (b) one of the first and second storage processors 46A, 46B, (c) one of the first and second switches 50A, 50B, and/or (d) a data store associated with one of the first and second data store systems 48A, 48B.

To elaborate, partial path redundancy is provided by rendering at least two of the network cards 44A-44D with the same initiator. If one of the at least two Ethernet cards fails, the other operative Ethernet card(s) provide(s) path redundancy for the initiator.

Partial path redundancy is provided by the two storage processors 46A, 46B. If one of the first and second storage processors 46A, 46B fails, the other storage processor may be utilized to provide the path redundancy between the I/O interface 42 and a data store. In this regard, the non-failing storage processor may use one or both of the switches 50A, 50B. For example, if the storage processor 46A is exclusively responsible for communications conducted over Ethernet card 44A, storage processor 46A needs to process a command propagated over Ethernet card 44A and associated exclusively with the first data store system 48A, and storage processor 46A fails, the storage processor 46B may utilize both the first and second switches 50A, 50B to complete a communication path between the Ethernet card 44A and the first data store system 48A (e.g., the storage processor 46B utilizes the first and second switches 50A, 50B to communicate with both the Ethernet card 44A and the first data store system 48A).

Partial path redundancy is provided by the first and second switches 50A, 50B. If one of the first and second switches 50A, 50B fails, the other switch may be utilized to provide the necessary path redundancy. This path redundancy is dependent upon the non-failing switch having: (a) access to a portion of the data store that provides data redundancy relative to the portion of the data store that is no longer accessible due to the failure of the other switch and (b) access to an Ethernet card that may be addressed by the same initiator as the Ethernet card(s) that is/are no longer available due to the failure of the other switch. For example, if Ethernet cards 44A and 44C are each addressable by the same initiator, the data store systems 48A and 48B each include an element that together define a data store in which one element mirrors the other element, and switch 50A fails, the switch 50B may be utilized to establish the necessary communication between the Ethernet card 44C and the element in data store system 48B.

Additionally, in many situations, multiple data stores that have different storage characteristics (e.g., speed, capacity, redundancy and/or reliability) are desired. In this regard, the first data store system 48A is comprised of: (a) a first data store that is a first CPU bus memory 52A (sometimes referred to as memory store 52A) and is relatively fast but with relatively low capacity and no redundancy, (b) a second data store that is a first solid state disk or drive (SSD) 54A with less speed but greater capacity relative to the first CPU bus memory 52A and no redundancy, and (c) a third data store in the form of a first RAID disk array 56A with less speed and greater capacity than the first solid state disk 54A and redundancy. CPU bus memory is memory that is accessible to a processor of a storage processor via the processor's address bus, available for use by the processor, useable by the processor in processing a block command packet, and does not contain any portion of the application program that is executed or could be executed in the processing of a block command packet. In contrast, the processor accesses the first SSD 54A and the first RAID disk array 56A via an expansion bus (e.g., PCIe). Relatedly, stores having similar characteristics are typically configured within a primary data storage system so as to constitute a tier.

It should be appreciated that the first data store system 48A may comprise other combinations of partial data stores and/or data stores. For instance, the first data store system 48A could include a first disk drive and the second data store system 48B could include a second disk drive, the first and second disk drives together forming a data store in which the first and second disk drives mirror one another to provide data redundancy. In the illustrated embodiment, the second data store system 48B includes data stores in the forms of a second CPU bus memory 52B (sometimes referred to as memory store 52B), a second SSD 54B, a second RAID disk array 56B. It should be appreciated that the second data store system 48B may also include other combinations of data stores and partial data stores.

In a data store system that includes CPU bus memory and non-CPU bus data storage, the switch that is used to establish connections between the processor of a storage processor and the data store system is comprised of a type A switch that establishes connections with the non-CPU bus data storage and a type B switch that establishes connections with the CPU bus memory.

Because the first and second data store systems 48A, 48B respectively include CPU bus memories 52A, 52B, the first and second switches 50A, 50B respectively include type B switches 60A, 60B that respectively allow the processors of the storage processors 46A, 46B to establish communication paths with the CPU bus memories 52A, 52B. A type B switch is comprised of the hardware, software, and/or firmware associated with a storage processor that allow the processor to access the memory locations on the CPU memory bus associated with the CPU bus memory.

Further, because the first and second data store systems 48A, 48B respectively include non-CPU bus data storage in the form of SSD and SAS devices, the first and second switches 50A, 50B respectively include type A switches 58A, 58B that respectively allow the processors of the storage processors 46A, 46B to establish communication paths with the non-CPU bus data stores. A type A switch is comprised of the hardware, software, and/or firmware associated with an expansion bus that allows the processor to access the data on the non-CPU bus data storages. In certain embodiments, the primary data storage system 28, the one or more data stores 48, or the like comprise a storage appliance (e.g., a network storage appliance, a storage area network (SAN) storage appliance, network-attached storage (NAS), or the like). A storage appliance, as used herein, comprises a specialized computing device configured to provide access to a data store 48 over a network or fabric, with or without a dedicated host device.

The second switch level 30 provides the ability for each of the initiators associated with the initiator level 24 to communicate with at least one network card associated with the primary data storage system 28, the at least one network card being associated with at least one storage processor of the primary data storage system 28. More specifically, the second switch level 30 operates to receive a block command packet from an initiator and process the block command packet so as to route the packet to the address that is associated with a particular network card. Conversely, the second switch level 30 also operates to receive a block result packet from the primary data storage system 28 and process the block result packet so as to route the packet to the appropriate initiator.

The second switch level 30 may include a single switch that selectively connects one or more initiators to one or more network cards or multiple switches that each selectively connects one or more initiators to one or more network cards. For the purpose of illustration, the second switch level 30 includes switch 61 that is capable of selectively establishing a communication path between each of the initiators 38A-38C and each of the network cards 44A-44D.

The secondary data storage level 32 provides secondary storage of data (e.g., storage that may not be constantly available for use by one or more user computers when the system 110 is in a normal/acceptable operating mode). In contrast, primary data storage is substantially constantly available for use by one or more user computers when the system 110 is in a normal/acceptable operating mode. The secondary data storage level 32 may include many different types of data storage, including hard disk storage, optical storage, tape drive storage, robotic data storage systems that mechanically move storage media between players/recorders and storage locations, "cloud" storage provided by a remote storage service provider, or the like. It should be appreciated that these types of data storage and other types of data storage that are largely used as secondary data storage can, in appropriate circumstances, become primary storage.

The secondary data storage level 32 includes a backup device 12 that may be in communication with one or more of the initiators at the initiator level 24 in response to a request packet issued by a user computer at the user level 22. In another embodiment, the source device 10 may be in direct communication with the backup device 12. For example, the secondary data storage level 32 may include a backup device 12 that includes a cloud storage service provider that is accessible to the primary data storage system 28 via the network 14. The cloud storage service provider may be a part of a data store, part of multiple data stores, a data store, multiple data stores, or combinations thereof that is respectively accessible to the storage processors 46A, 46B via network cards 66A, 66B (which are Ethernet cards in the illustrated embodiment) and the type A switches 58A, 58B respectively associated with switches 50A, 50B.

As discussed above with reference to FIG. 1A, the replication module 150, in one embodiment, is configured to populate an archive with at least a portion of a snapshot for a storage volume. The storage volume may be a logical storage partition associated with a solid-state storage device 54, a hard disk drive 56, or the like. In some embodiments, the replication module 150 is configured to populate the archive with metadata for the portion of the snapshot that populated the archive. In a further embodiment, the replication module 150 is configured to asynchronously store the archive to a storage location in a generic format as part of an asynchronous replication process. In certain embodiments, the replication module 150 stores the archive on a backup device 12. The replication module 150, in one embodiment, restores at least a portion of the snapshot, which is selected based on the metadata, from the storage location in response to a restore event.

The system administrator computer 34 communicates with the primary data storage system 28 and, more specifically, the storage processor(s) in the primary data storage system 28 to define the manner in which the data storage provided by the primary data storage system 28 may be utilized. The communication path between the system administrator computer 34 and a storage processor in the primary data storage system 28 is from the system administrator computer 34 to the switch 40 and from the switch 40 to a network card. The network card and the storage processor may be connected to one another via the switch in the primary data storage system 28 that services the network cards associated with the initiators.

In the illustrated embodiment, the system administrator computer 34 respectively communicates with the storage processors 46A, 46B via network cards 68A, 68B and switches 50A, 50B.

It should be appreciated that the administrator computer 34 may also communicate with the storage processors 46A, 46B via one or more paths that include the first switch level 26, the initiator level 24, and the second switch level 30.

Figure 2:
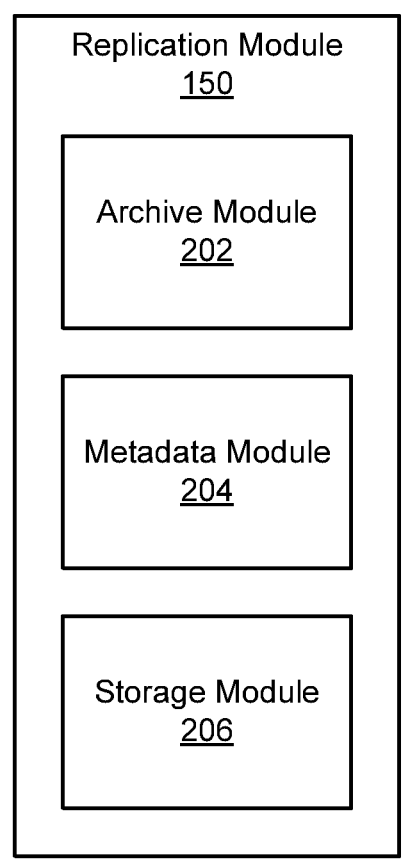
FIG. 2 is a schematic block diagram illustrating one embodiment of a replication module.

FIG. 2 depicts one embodiment of a replication module 150. The replication module 150 may be substantially similar to the replication module 150 described above with regard to FIGS. 1A and 1B. In the depicted embodiment, the replication module 150 includes an archive module 202, a metadata module 204, and a storage module 206, which are described in more detail below.

In one embodiment, the archive module 202 populates an archive with at least a portion of a snapshot for a storage device. As used herein, a snapshot comprises a copy or record of the state of a system (e.g., a source device 10, a data store 48, a storage volume, a non-volatile storage device 54, 56, a file system, a database, a virtual machine, or the like) at a particular point in time (e.g., a point in time copy). In certain embodiments, a snapshot comprises a point in time copy or clone of data that may be readable, writeable, read-only, write-only, or the like. In some embodiments, snapshots or point in time copies may be created for volatile and/or non-volatile storage volumes (e.g., creating a snapshot of an entire volume or a portion of the volume), file systems (e.g., creating a snapshot of one or more files, folders, etc.), databases (e.g., creating a snapshot of one or more database tables), operating systems, virtual machines, or the like. A snapshot or point in time copy may comprise a series of commands, instructions, functions, routines, queries, or the like, as described above with regard to the journal, which commands may be executed in a predetermined order to restore data of a snapshot on a device. Executing these commands, instructions, functions, routines, queries, or the like, may restore the snapshot to its original consistent state. In certain embodiments, snapshots or point in time copies may be used for data backups and restores, application checkpoints, restore points, system images, or the like.

In certain embodiments, a snapshot or a point in time copy includes a full backup of a storage volume, a journal, a non-volatile storage device, a physical partition, a logical partition, a disk sector, or the like. A snapshot comprising a full backup, for example, may include all the data, files, applications, programs, databases, or the like, for a storage volume. In one embodiment, a snapshot or point in time copy includes a differential backup, which is a backup of data that has changed since the last full backup. For example, if a full backup is performed on Sunday, a differential backup on Monday would only backup data that changed since Sunday, a differential backup on Tuesday would only backup data that changed since Sunday, and so on. In some embodiments, the snapshot includes an incremental backup, which is a backup of data that changed since the last backup, either full, differential, incremental, or the like. For example, an incremental backup performed on Tuesday may back up data that has changed since a previous incremental backup on Monday.

In one embodiment, snapshots may be generated by an operating system, a third-party application (e.g., a snapshot or backup manager), or the like. Snapshots may be generated according to a schedule, such as a full backup snapshot being created every Sunday, with incremental backups being created Monday through Saturday. A user may also determine when to generate snapshots, which data to back up, the type of snapshot to generate, or the like. A source device 10 may include a snapshot manager (e.g., the archive module 202) that creates and/or manages one or more snapshots for the source device 10, or more particularly, for the data, volumes, applications, or the like, of the source device 10.

In one embodiment, the archive module 202 populates an archive (e.g., an asynchronous backup) with at least a portion of a snapshot, with one or more snapshots, with a plurality of snapshots, or the like. The archive module 202, in certain embodiments, may create or generate one or more snapshots, as described above. In another embodiment, the archive module 202 may populate an archive with one or more snapshots created or generated by another entity, such as a snapshot manager, an operating system, another module, or the like. The archive module 202, in certain embodiments, is configured to identify, select, locate, and/or determine a snapshot, a portion of a snapshot, a plurality of snapshots, or the like for archiving. The archive module 202 may identify a snapshot based on user input (e.g., a user selection of a snapshot for archiving using a graphical user interface, a command line interface, or another user interface); based on an archival policy, an archival rule, and/or an archival plan; based on a quality-of-service level for data of a snapshot; based on a time or time period in which a snapshot was made; and/or based on another attribute of a snapshot, of data of a snapshot, or the like. In certain embodiments, the archive module 202 may iteratively select each snapshot for archiving, sequentially by time, by priority/quality-of-service level, or the like.

As used herein, an archive comprises a backup copy of data, which may be stored at a different location, or the like. An archive or backup may comprise one or more objects, ranges of data, containers, files, folders, or the like that include one or more data objects (e.g., snapshots, files, folders, images, documents, videos, or the like) and metadata associated with the data objects, allowing the archived data objects to be restored or the like. In certain embodiments, an archive or backup is used to collect multiple data objects together into a single archive object, which may be remote, portable, storable, and/or compressible. The archive module 202, in certain embodiments, may format an archive or an archive container with a particular archive format, such as a generic, standard, common, or universal format, so that the archive or archive container may be stored in a generic, standard, non-proprietary, and/or common location (e.g., a third-party device, a device from another vendor, or the like). In other embodiments, the archive module 202 formats an archive or an archive container with a format that is acceptable for the storage of the archive on the storage location or target device.

While a format or container for an archive, as described below, may be generic, standard, non-proprietary, and/or common (e.g., one or more files, one or more blocks of a block device), in one embodiment, metadata for the archive may be proprietary and only interpretable by a module compatible with the metadata and/or configured to interpret the metadata (e.g., the restore module 150) to restore data of the archive. In some embodiments, the archive module 202 may add a snapshot to an already existing archive that contains multiple snapshots, or layers, of a storage volume. In a further embodiment, the archive module 202 may create a separate archive, a separate archive file, or the like for each snapshot of a storage volume.

In one embodiment, the archive comprises one or more data files and is stored to a storage location (e.g., a third-party storage location or device, a storage location or device from a different vendor, or the like) using a file system interface, an application programming interface (API) of a cloud/remote storage service provider which may be accessible over a wide area network (WAN) (e.g., the Internet), or the like. In a further embodiment, the archive comprises one or more blocks of data (e.g., physical records associated with logical addresses of a storage location) and is stored to a storage location using a block device interface. The archive module 202, in one embodiment, populates the archive with at least a portion of a snapshot from a source device 10, and may be sent to and stored on a backup device 12. In some embodiments, the archive module 202 streams data comprising at least a portion of the snapshot to the backup device 12 and the archive module 202 populates the archive on the backup device 12. In certain embodiments, the process of populating the archive with snapshot data and metadata describing the snapshot data is known as dehydrating the snapshot, and the process of restoring the snapshot from the archive, based on the metadata, is known as rehydrating the snapshot. For the archive module 202 to use the file system interface application programming interface (API) of a cloud/remote storage service provider which may be accessible over a wide area network (WAN) (e.g., the Internet), or the like that will format the archive in a manner suitable for storage on the storage location (or target device), the archive module needs either a prior knowledge of the archiving protocol of the storage location or some kind of protocol negotiation needs to occur between the archive module and the storage location to effect the appropriate translation of the archiving protocol of the source device into an acceptable format for the storage of the archive on the target device.

In one embodiment, the metadata module 204 is configured to populate the archive with metadata for at least a portion of the snapshot in the archive. As used herein, metadata comprises data that describes one or more characteristics of the snapshot, including the structure of the snapshot, the data of the snapshot, or the like. In certain embodiments, the one or more characteristics include an initiator identifier, a volume identifier, an LBA/page number field, a sector count field, a page offset field, a command field, an error code field, an error offset field, the number of data segments, a data segment vector field, a data cyclic redundancy check (CRC) field, a quality of service field, a timestamp, a size, or the like. It should be appreciated that it may be unnecessary to populate the archive with all of the metadata associated with the archive. For instance, CRC metadata can be regenerated if needed.

In some embodiments, the metadata may be used to restore at least a portion of the snapshot. In certain embodiments, the metadata module 204 stores the metadata for a snapshot in a particular format, structure, or the like such that a device or module (e.g., the restore module 304) that is compatible with and/or configured to interpret the metadata may restore the snapshot. For example, the metadata module 204 may store the metadata in a format that is unique, distinct, proprietary, or the like, so that only devices or modules that are compatible with (e.g., a device that is able to access, read, interpret, and/or understand, the format of the metadata) may restore the snapshot.

In one embodiment, the metadata module 204 populates the archive with metadata on a source device 10, which may be sent to and stored on a backup device 12. In some embodiments, the metadata module 204 streams metadata to the backup device 12 and the metadata module 204 populates the archive on the backup device 12. In certain embodiments, the metadata module 204 stores metadata in an archive, file, container, object, or the like that is separate from the archive comprising the snapshot.

In a further embodiment, the metadata module 204 maintains a primary metadata file that includes information describing metadata that is associated with each snapshot of a plurality of snapshots. In some embodiments, the primary metadata file includes information identifying the locations of metadata for each snapshot of a plurality of snapshots located in the storage location. For example, if a backup device 12 stores a plurality of snapshot archives, including metadata for each snapshot, the metadata module 204 may maintain a primary metadata file that may be referenced to determine which archive includes a particular metadata file or files, a particular snapshot or data of the snapshot (e.g., a file, folder, application, etc.), a snapshot generated at a particular time, or the like.

In one embodiment, the storage module 206 is configured to store or transfer the archive to a storage location in a generic format or container as part of a replication process (e.g., asynchronous replication), thereby replicating or copying one or more snapshots or point in time copies of the archive at the storage location. As used herein, a generic, standard, or common format for an archive or archive container comprises a format that may be stored in a generic or common location (e.g., a third-party device from a different vendor, a non-proprietary device, a standard device, a storage resource of a remote storage service provider, or the like), using a generic, public, common, standard, and/or non-proprietary interface or the like. In this manner, the storage module 206 may store an archive using a standard interface (e.g., a file system interface, a block device interface, an application programming interface (API) of a remote storage service provider), a partition, a storage volume, a database entry and/or table, or the like) thereby avoiding vendor lock-in, allowing one vendor to perform asynchronous replication of snapshots to one or more storage devices or other storage locations provided by a different vendor (e.g., third-party storage locations).

For example, if a user purchases and installs a new storage system from a first vendor, instead of purchasing and installing an additional backup storage system from the first vendor, the storage module 206 may allow the user to use an existing storage system (e.g., the old, third-party storage system) from a second vendor to store backup archives, thereby reducing the barrier of entry for the first vendor. Further, a replication process may comprise a data backup or copy process that stores data from a source storage medium to a target storage medium. In various embodiments, one or more of the source and target storage media may be located on the same device, on different devices, on remote devices, on network or cloud devices, or the like.

A target storage medium, a target storage device, a target storage location, or the like, for an archive, as described above, may comprise a third-party storage medium, storage device, and/or storage location. A third-party storage medium, third-party storage device, and/or third-party storage location, as used herein, comprises a storage medium, storage device, and/or storage location from, or provided by, a different entity (e.g., different manufacturer, different vendor, different company, or the like) than a source storage medium, source storage device, and/or source storage location of a data transfer. For example, as described above, a third-party storage location may comprise an existing or old storage system, to which the storage module 206 may store an archive from a new storage system, installed to replace the existing or old third-party storage system, or the like.

One embodiment of a third-party storage location, comprises a storage location of a remote storage service provider, which may be accessible over a data network (e.g., a WAN, the Internet) using an API of the remote storage service provider or the like. A remote storage service provider, as used herein, comprises a vendor or provider of data storage over a data network. A remote storage service provider may provide one or more data storage plans, one or more data storage capacities, or the like to a user. A remote storage service provider may provide access to data through an API, through an internet browser, through a desktop or mobile application, or otherwise over a data network, such as the internet or another WAN. A remote storage service provider may comprise one or more storage resources, which the storage module 206 may access to store and/or retrieve data. A storage resource, as used herein, may comprise a physical or logical location to which data may be stored (e.g., written and/or read). A storage resource may comprise a single storage medium and/or storage device, may comprise an array of multiple storage media and/or storage devices, may comprise a local data storage and/or remote data storage, may comprise volatile and/or non-volatile memory media, may comprise a combination of one or more storage locations, or the like. A storage resource may be available over a local interface (e.g., a file system interface, a block device interface, an API, a storage bus, a memory bus, or the like), over a remote interface or network interface (e.g., an API, a SAN, a NAS, or the like), or over another interface.

In certain embodiments, the storage module 206 stores the archive to a storage location. The storage location may include non-volatile storage of a backup device 12 or other third-party storage location, such as a third-party storage device, a backup server, a storage resource of a remote storage service provider, or the like. The storage module 206, in certain embodiments, may store an archive as several data files, and may size each data file to satisfy a file size limit of a storage location, such as a file size limit of a storage resource of a remote storage service provider, or the like. The storage module 206 may store archives of snapshots for a non-volatile storage medium in a plurality of storage locations, partitions, devices, or the like. In certain embodiments, the storage module 206 stores the archive on a portable, non-volatile storage device, such as a USB flash drive, an external hard disk drive, a CD-ROM or other optical storage medium, or the like. In this manner, the archive may be easily transported and stored, copied, installed, mounted, or the like, on a device that may not be in communication with the source device 10 or backup device 12 (e.g., may not be communicatively coupled to the source device 10 or the backup device 12 through the network 14 or otherwise), or a device that may be in a different geographic location than the source device 10 or backup device 12. For example, a user may physically transfer an archive stored on a portable storage device to a server or data center at a different geographic location (e.g., a different building, a different city, a different state, a different company) using physical transportation (e.g., a mail or delivery service, a vehicle, or the like) and may restore one or more snapshots from the archive on the portable storage device at the different geographic location.

In one embodiment, the storage module 206 asynchronously stores the archive as part of an asynchronous replication process. As used herein, an asynchronous replication process is a replication process that writes data, such as snapshots or point in time copies of data, to a primary storage area first (e.g., the primary data storage system 28) and that replicates the data to secondary storage area (e.g., a backup device 12) at a later time. The primary storage area, however, does not wait for the data to be written to the backup device 12 before acknowledging the write request, accepting new write requests, or the like, which may improve availability of the primary storage area, unlike a synchronous replication process. The asynchronous archiving of a storage volume snapshot recognizes the time constraints associated with a primary data storage system that strives to appear to be substantially constantly available to user computers that utilizing the system. Namely, regardless of whatever process triggers the asynchronous archiving of a storage volume snapshot, the actual transfer of data to a backup storage device will occur in accordance with the time constraints present in the system. For example, an archiving operation may be accorded a low priority relative to other operations that are being requested of the system. As a consequence, the primary data storage system may delay the processing of the archiving operation relative to other operations. Conversely, asynchronous archiving also contemplates the possibility that the archiving operation may have a higher priority relative to one or more other operations that are being requested of a primary data storage system and, as such, be processed by the primary data storage system before such other operations. In certain embodiments, the storage module 206 synchronously stores the archive as part of a synchronous replication process. Unlike an asynchronous replication process, in a synchronous replication process, after data is written to the primary storage area, the primary storage area waits until the data is copied to the backup device 12 before it acknowledges the write request and accepts new write requests. A primary data storage system that implements a synchronous replication or archiving process is foregoing the goal of being substantially constantly available to user computers. In synchronous archiving, each write of data to a storage volume of the primary storage device causes a snapshot to be taken and an archive of the snapshot to be immediately initiated, thereby providing archiving of data for each instance in which data is written to the storage volume and before any other data is written to the storage volume. In certain embodiments, the storage module 206 stores the archive in response to a semi-synchronous replication process, which allows the primary storage area to accept new write requests after the backup device 12 acknowledges receipt of the data, but before the backup device 12 copies the data to a backup storage area, or the like.

Figure 3:
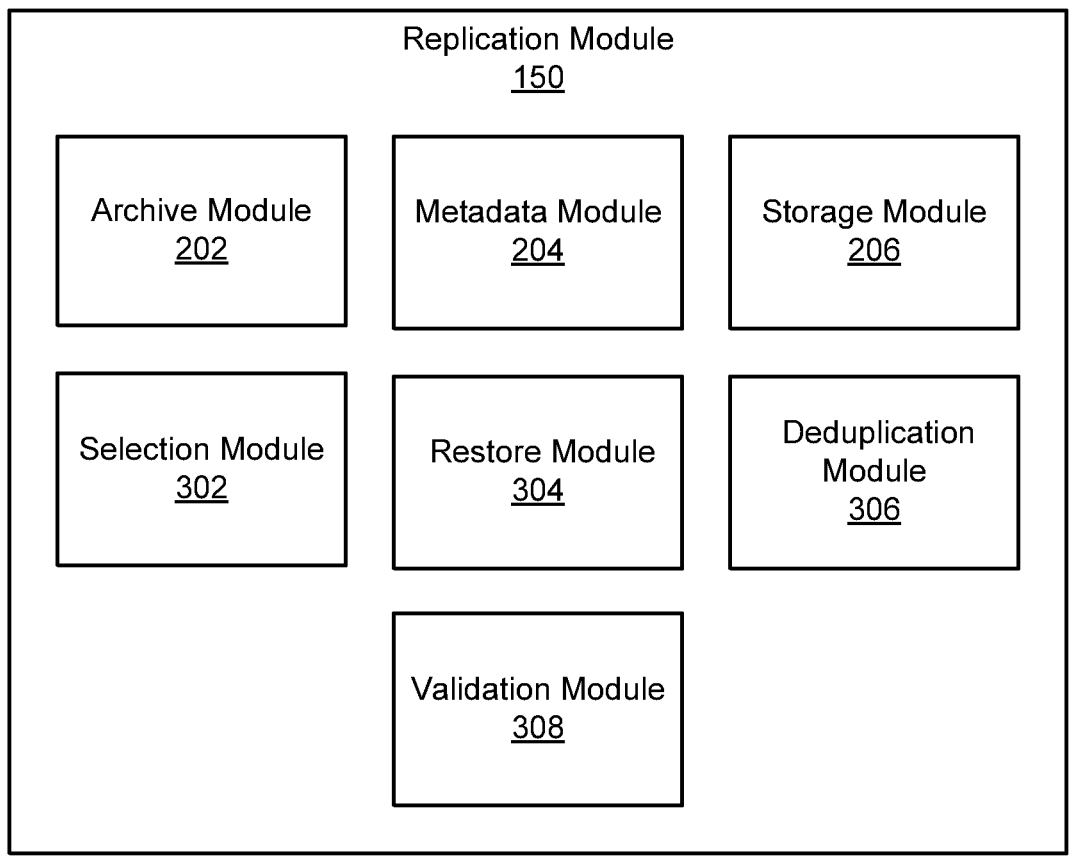
FIG. 3 is a schematic block diagram illustrating one embodiment of another replication module.

FIG. 3 depicts one embodiment of a replication module 150. The replication module 150 may be substantially similar to the replication module 150 described above with regard to FIGS. 1A, 1B, and 2. In the depicted embodiment, the replication module 150 includes an archive module 202, a metadata module 204, and a storage module 206, which may be substantially similar to the archive module 202, the metadata module 204, and the storage module 206 described above with reference to FIG. 2. Additionally, the replication module 150 depicted in FIG. 3, in one embodiment, includes a selection module 302, a restore module 304, a deduplication module 306, and a validation module 308, which are described below in more detail.

The selection module 302, in one embodiment, is configured to select at least a portion of the snapshots of a non-volatile storage medium stored at a storage location. In certain embodiments, a snapshot is located in an archive that is stored in a generic format at the storage location. The selection module 302 may select a snapshot, or a portion of a snapshot, such as a file, folder, or the like, by marking the selected portions for retrieval by the restore module 304. The selection module 302, in a further embodiment, selects at least a portion of the snapshots based on metadata retrieved by the metadata module 204. As described above, the metadata may describe the data that is stored in each snapshot, which the selection module 302 may use to locate the snapshot, or snapshots, that contains the requested data. The selection module 302 may identify archived storage volume snapshot data for retrieval or restoration from a storage location based on user input (e.g., a user selection of archived storage volume snapshot data for retrieval using a graphical user interface, a command line interface, or another user interface); based on an archival-restoration policy, an archival-restoration rule, and/or an archival-restoration plan; based on a quality-of-service level for data of archived snapshot data; based on a time or time period in which a snapshot was made; and/or based on another attribute of a snapshot, of data of a snapshot, or the like.

For example, in response to a restore event, or the like, the metadata module 204 may retrieve metadata associated with snapshots for a storage volume from the storage location. Based on the retrieved metadata, the selection module 302 may determine which portions of the snapshots to select from the storage location that contain data to be restored, installed, mounted, executed, or the like. For example, the selection module 302 may check the metadata associated with each snapshot to find a version of a file from last month and a version of the same file from last week. The selection module 302 may select the versions of the file from each snapshot instead of retrieving the entire snapshot from the storage location. In this manner, the selection module 302, in certain embodiments, selects at least a portion of the snapshots based on the metadata instead of selecting entire snapshots.

In certain embodiments, the metadata module 204, as described above, maintains a primary or master metadata file that identifies the location of metadata for each snapshot of a plurality of snapshots located in the storage location. The metadata module 204 may initially retrieve the primary metadata file instead of retrieving metadata associated with each snapshot. The selection module 302 may check the primary metadata file to determine where metadata for a particular snapshot is located or which snapshots contain the requested data, and may notify the metadata module 204 to retrieve the metadata for those snapshots. For example, the primary metadata file may organize various references to metadata using a timestamp and the selection module 302 may reference the primary metadata file to locate the snapshot, or more particularly, the metadata for the snapshot, for a requested time period. In this manner, the selection module 302 may determine which snapshots to select by referencing a single metadata file instead of checking each metadata file associated with each snapshot.

The restore module 304, in one embodiment, is configured to retrieve the selected snapshots, or portions of snapshots, from an archive stored in a generic format at a storage location and restore the selected snapshots, or portions of snapshots, in response to a restore event. In some embodiments, the restore module 304 retrieves snapshots, or portions of snapshots, that have been marked for retrieval by the selection module 302. In certain embodiments, the restore module 304 downloads the selected snapshots, or portions of snapshots from a backup device 12 in the cloud (e.g., of a remote storage service provider), a backup device 12 on the network 14 (such as a storage area network), or a similar device in communication with the restore module 304. The restore module 304 may restore, install, mount, copy, execute, or the like, the snapshots, or portions of snapshots, on the source device 12 or a device similar to the source device 12, a virtual machine, a cloud device or storage service, a remote device, or the like, that is compatible with and is configured to interpret the metadata. The restore module 304 may not restore the snapshots to a device that is not compatible with the metadata, meaning the device may not read the metadata due to the metadata format, structure, organization, arrangement, field types, or the like.

In one embodiment, the restore module 304 restores a full snapshot to a device. In such an embodiment, the restore module 304 may overwrite the current state of a device and restore a previous state of the device from the snapshot. For example, the restore module 304 may restore a snapshot of a device that includes the state of an operating system, files, applications, data, or the like at a particular time (e.g., a day ago) which may overwrite the current state of the device with the state of the device captured in the snapshot. In another example, the restore module 304 may restore a snapshot containing the state of a database at a particular time to overwrite a current state of the database. In another embodiment, the restore module 304 restores a portion of a selected snapshot. For example, the restore module 304 may restore a version of a file from last week and overwrite the current version of the file. In certain embodiments, the restore module 304 restores a full snapshot, or a portion of a snapshot, in response to a restore event, a disaster event (such as a hardware malfunction), or the like.

In one embodiment, the restore module 304 restores a snapshot comprising a collection of commands by executing the commands. For example, in a journaling file system, the snapshot may comprise a list (e.g., a journal) of changes that have been made to a file system since the last snapshot was created. In order to restore the snapshot to a current state, in the event of a disaster, for example, the restore module 304 may execute the commands in the order presented in the list. Similarly, a snapshot of a database may comprise a log of queries performed on the database, such that the restore module 304 executes the queries in order to restore the database to the snapshot state.

In certain embodiments, the restore module 304 instantiates a new storage volume based on a snapshot. For example, the restore module 304 may retrieve a full snapshot of a storage volume from the source device 10 and create a new storage volume on a different device based on the full snapshot, such that the new storage volume is a mirror-image of the storage volume on the source device 10. In one embodiment, the restore module 304 creates a storage volume by restoring a chain of snapshots. For example, the restore module 304 may retrieve a base snapshot (e.g., a full snapshot of a storage volume of the source device 10) and one or more differential or incremental snapshots associated with the base snapshot. The restore module 304 may then restore the base snapshot and the one or more differential or incremental snapshots in order such that at the end of the chain, the storage volume mirrors the storage volume for the snapshots.

In one embodiment, the deduplication module 306 is configured to perform data deduplication on an archive, a snapshot, a portion of a snapshot, or the like. As used herein, data deduplication is the process of eliminating one or more duplicate copies of repeated data, thereby conserving storage capacity. In some embodiments, the deduplication module 306 checks the archive for duplicate data after it has been populated (e.g., on the backup device 12). In certain embodiments, the deduplication module 306 analyzes the snapshot and removes redundant data before it is placed in the archive (e.g., on the source device 10, as it is being streamed to the archive or the like). In a further embodiment, the deduplication module 306 may use an existing deduplication index for data that has already been deduplicated prior to a snapshot copy being made.

In one embodiment, the deduplication module 306 stores unique bit patterns, byte patterns, blocks of data, or the like as the data (e.g., the archive, snapshot, or the like) is analyzed. Thereafter, if a bit pattern, a byte pattern, or a block of data is encountered that has already been stored, the deduplication module 306 replaces the redundant data with a marker to the identical stored data. In certain embodiments, the deduplication module 306 maintains a deduplication index, dictionary, list, set, or the like of data markers, flags, indicators, or the like, which may be used to restore the data. In certain embodiments, by removing redundant copies of data from the archive, the deduplication module 306 compresses the size of the archive. In this manner, if the deduplication module 306 performs deduplication on the source device 10, the amount of data sent to the backup device 12 is smaller than if the deduplication is performed on the backup device 12.

In one embodiment, the deduplication module 306 stores the deduplication index in the metadata for a snapshot. In certain embodiments, the restore module 304 references the deduplication index in the metadata in order to restore at least a portion of a snapshot. In such an embodiment, the deduplication module 306, in response to a signal, notification, message, or the like, from the restore module 304, restores the redundant data removed from the archive or snapshot such that the data is the same as it was before the deduplication module 306 removed the redundant data and is able to be restored. For example, the deduplication module 306 may restore certain deduplicated data from one or more snapshots in an archive by determining one or more values for the deduplicated data using a deduplication index or the like and restoring the one or more values (e.g., the original data prior to deduplication). In some embodiments, the deduplication module 306 restores the redundant data for a portion of an archive or snapshot instead of restoring the redundant data for the entire archive or snapshot, in response to the selection module 302 selecting only a portion of the archive or snapshot to be restored. In a further embodiment, the deduplication module 306, instead of undoing the deduplication for restored data, may restore deduplicated data from an archived snapshot by copying the data (e.g., including any deduplication markers or identifiers) and at least a portion of a deduplication index associated with the data, so that the restored data remains deduplicated.

In one embodiment, the validation module 308 is configured to verify the integrity of the selected snapshots, or portions of snapshots, prior to archiving or restoring the snapshots, or portions of snapshots. As used herein, data integrity refers to the accuracy and/or consistency of data. In particular, the validation module 308 may ensure that the data is recorded exactly as intended, and that retrieved copies of the data are exactly the same as the stored copies. The validation module 308, therefore, verifies that snapshot data to be written to a backup device 12 is consistent with the original data on the source device 10. In further embodiments, the validation module 308 verifies that snapshot data to be retrieved and restored is consistent with the snapshot data stored on the backup device 12 prior to being restored.

In certain embodiments, the validation module 308 stores verification information for a snapshot in the metadata for the snapshot. The verification information, for example, may include error-detecting codes (such as data for a cyclic redundancy check), checksum data, repetition codes, parity bits, cryptographic hash function data, error correction codes, or the like. The validation module 308, in certain embodiments, retrieves the verification data from the metadata (as retrieved by the metadata module 204) and runs one or more verification checks on the selected snapshots before the restore module 304 restores the snapshots.

In some embodiments, the validation module 308 associates one or more storage device identifiers with a snapshot in response to the archive module 202 populating the archive with the snapshot. The storage device identifiers indicate one or more storage devices associated with the snapshot of the storage volume (e.g., the snapshot is for a non-volatile storage volume that spans the one or more non-volatile storage devices indicated by the identifiers). In such an embodiment, in response to a restore event, the validation module 308 verifies that the snapshot, or a portion of the snapshot, selected to be restored, is associated with one or more non-volatile storage devices that are the targets for the restored snapshot. In a further embodiment, the validation module 308 associates a snapshot, or a portion of a snapshot, with a particular device, such as the source device 10, such that the snapshot may only be restored on the source device 10. In such an embodiment, the validation module 308 associates a device identifier for the source device 10 with the snapshot (e.g., by storing the device identifier in the metadata for the snapshot or the like).

In certain embodiments, the validation module 308 encrypts one or more archives, snapshots, metadata files, or the like that are stored on the backup device 12. In this manner, the validation module 308 verifies that the snapshot data cannot be tampered with by an unauthorized entity. In certain embodiments, the validation module 308 encrypts the snapshot before the archive module 202 populates the archive with the snapshot. In some embodiments, the validation module 308 encrypts the archive after the archive module 202 has populated the archive with a snapshot. Similarly, the validation module 308 may encrypt the metadata before the metadata module 204 populates the archive with the metadata or after the metadata has been placed in the archive. Before restoring a snapshot, the validation module 308 may decrypt an archive, a snapshot, a metadata file, or the like such that the data is accessible and may be restored by the restore module 304.

Figure 4:
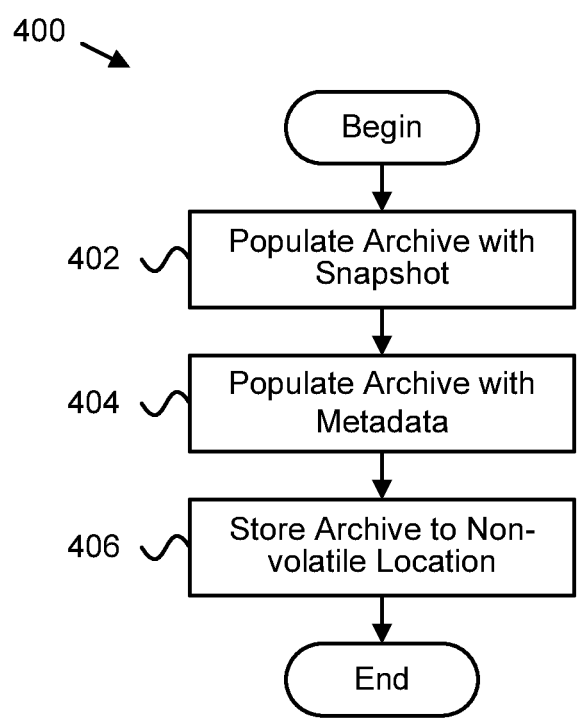
FIG. 4 is a schematic flow chart diagram illustrating one embodiment of a method for archiving storage volume snapshots.

FIG. 4 is a flow chart diagram illustrating one embodiment of a method 400 for archiving storage volume snapshots. In one embodiment, the method 400 begins and the archive module 202 populates 402, an archive with at least a portion of a snapshot for a non-volatile storage device. In certain embodiments, a snapshot comprises a backup or replication of a storage volume. In a further embodiment, a metadata module 204 populates 404 the archive with metadata for at least a portion of the snapshot in the archive. In certain embodiments, the metadata allows at least a portion of the snapshot to be restored by a device that is compatible with the metadata (e.g., is configured to read and interpret the format, structure, or the like of the metadata). In one embodiment, the storage module 206 asynchronously stores 406 the archive to a storage location in a generic format as part of an asynchronous replication process, and the method 400 ends.

Figure 5:
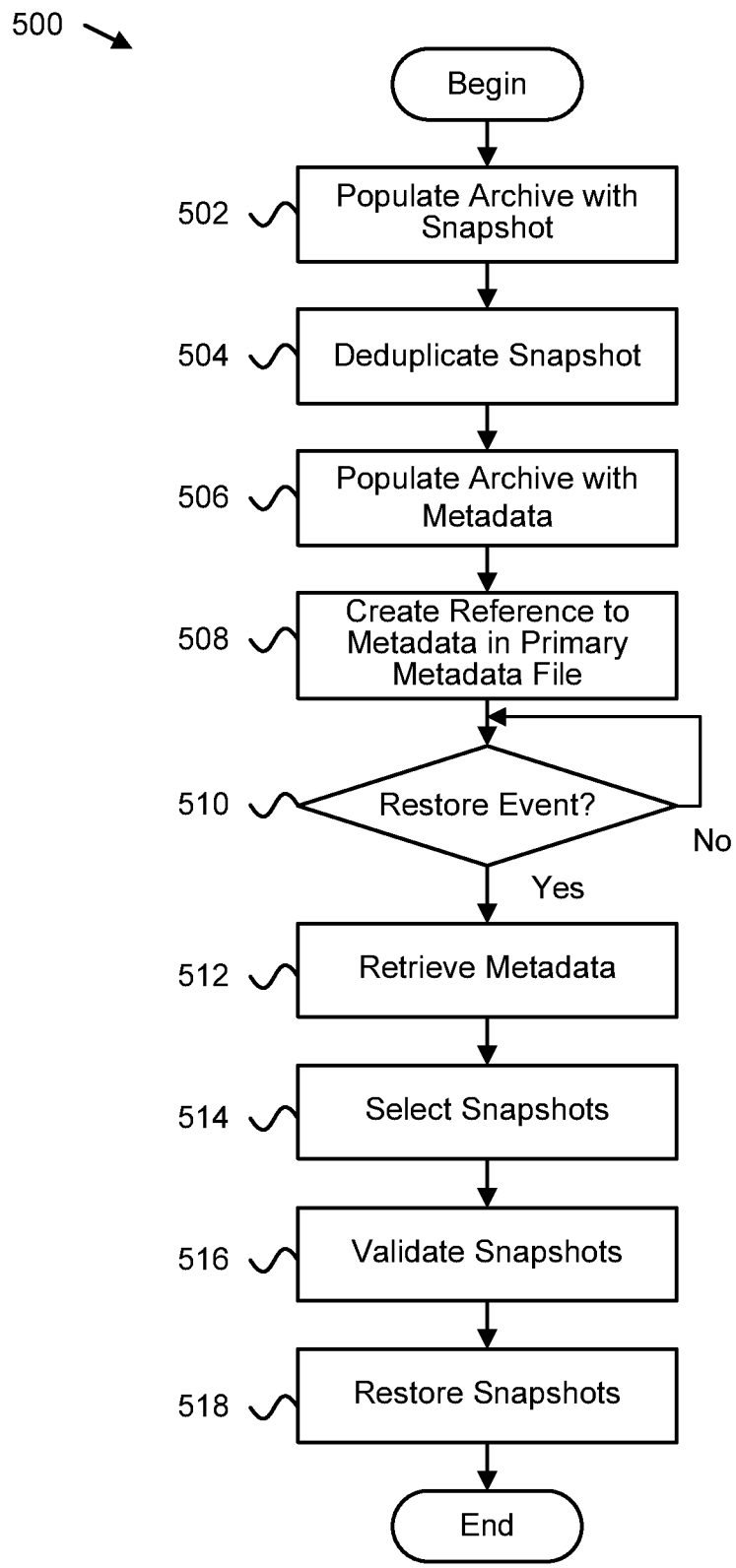
FIG. 5 is a schematic flow chart diagram illustrating a further embodiment of a method for archiving storage volume snapshots.

FIG. 5 is a flow chart diagram illustrating one embodiment of another method 500 for archiving storage volume snapshots. In one embodiment, the method 500 begins and the archive module 202 populates 502, an archive with at least a portion of a snapshot for a non-volatile storage device. In some embodiments, the deduplication module 306 performs 504 data deduplication on an archive, a snapshot, a portion of a snapshot, or the like. In certain embodiments, the deduplication module 306 maintains a deduplication index in the metadata for a snapshot, which may be used to restore the data (e.g., to restore the deduplicated data in response to a snapshot restore event).

The metadata module 204, in one embodiment, populates 506 the archive with metadata for at least a portion of the snapshot in the archive. In certain embodiments, the metadata module 204 creates 508 a reference to the metadata (e.g., the location of the metadata in the archive) for the snapshot in a primary metadata file. For example, the primary metadata file may be referenced to locate the metadata for a snapshot if a backup device 12 stores a plurality of snapshots and accompanying metadata.

In a further embodiment, the restore module 304 detects 510 the occurrence of a restore event. If the restore module 304 determines 510 that a restore event has occurred, the metadata module 204 retrieves 512 metadata from the archive. Based on the metadata, the selection module 302 selects 514 at least a portion of snapshots to be restored. In certain embodiments, the deduplication module 306 restores the redundant data that may have been removed when the snapshot was archived. In certain embodiments, the deduplication module 306 references a deduplication index stored with the metadata for the snapshot, which allows the deduplication module 306 to restore the removed redundant data.

In one embodiment, the validation module 308 verifies 516 the integrity of the selected portions of the snapshots prior to the selected portions of the snapshots being restored. In some embodiments, the validation module 308 checks one or more of the consistency, accuracy, integrity, or the like, of the selected portions of the snapshots in order to determine whether the selected portions of the snapshots are the same as the corresponding stored copies of the snapshots prior to restoring the snapshot data. In a further embodiment, the restore module 304 restores 518 the selected portions of the snapshots at a storage location that is compatible with and/or configured to interpret the metadata. In certain embodiments, the restore module 304 restores 518 the selected portions of the snapshots from a portable storage device to a different geographic location than the location where the archive was created, and the method 500 ends.

A means for generating a deduplication index in response to deduplicating data for at least a portion of a snapshot, in various embodiments, may include a replication module 150, a deduplication module 306, an archive module 202, a processor, a storage controller, a backup manager, a snapshot manager, a device driver, an operating system, other logic hardware, and/or other executable code stored on a computer readable storage medium. Other embodiments may include similar or equivalent means for generating a deduplication index in response to deduplicating data for at least a portion of a snapshot.

A means for accessing a deduplication index for at least a portion of a snapshot in response to a restore event, in various embodiments, may include a replication module 150, a deduplication module 306, a metadata module 204, a restore module 304, a processor, a storage controller, a backup manager, a snapshot manager, a device driver, an operating system, other logic hardware, and/or other executable code stored on a computer readable storage medium. Other embodiments may include similar or equivalent means for accessing a deduplication index for at least a portion of a snapshot in response to a restore event.

A means for restoring deduplicated data for at least a portion of a snapshot based on a deduplication index in response to a restore event, in various embodiments, may include a replication module 150, a deduplication module 306, a restore module 304, a processor, a storage controller, a backup manager, a snapshot manager, a device driver, an operating system, other logic hardware, and/or other executable code stored on a computer readable storage medium. Other embodiments may include similar or equivalent means for restoring deduplicated data for at least a portion of a snapshot based on a deduplication index in response to a restore event.

A means for populating an archive with at least a portion of a snapshot for a storage volume, in various embodiments, may include a replication module 150, an archive module 202, a processor, a storage controller, a backup manager, a snapshot manager, a device driver, an operating system, other logic hardware, and/or other executable code stored on a computer readable storage medium. Other embodiments may include similar or equivalent means for populating an archive with at least a portion of a snapshot for a storage volume.

A means for populating an archive with metadata for at least a portion of a snapshot, in various embodiments, may include a replication module 150, a metadata module 204, a processor, a storage controller, a backup manager, a snapshot manager, a device driver, an operating system, other logic hardware, and/or other executable code stored on a computer readable storage medium. Other embodiments may include similar or equivalent means for populating an archive with metadata for at least a portion of a snapshot.

A means for retrieving metadata from a backup of a plurality of snapshots, in various embodiments, may include a replication module 150, a metadata module 204, a restore module 304, a processor, a storage controller, a backup manager, a snapshot manager, a device driver, an operating system, other logic hardware, and/or other executable code stored on a computer readable storage medium. Other embodiments may include similar or equivalent means for retrieving metadata from a backup of a plurality of snapshots.

A means for selecting at least a portion of a snapshot based on retrieved metadata, in various embodiments, may include a replication module 150, a selection module 302, a restore module 304, a processor, a storage controller, a backup manager, a snapshot manager, a device driver, an operating system, other logic hardware, and/or other executable code stored on a computer readable storage medium. Other embodiments may include similar or equivalent means for selecting at least a portion of a snapshot based on retrieved metadata.

A means for restoring at least a portion of a snapshot from an archive to a storage location, in various embodiments, may include a replication module 150, a restore module 304, a processor, a storage controller, a backup manager, a snapshot manager, a device driver, an operating system, other logic hardware, and/or other executable code stored on a computer readable storage medium. Other embodiments may include similar or equivalent means for restoring at least a portion of a snapshot from an archive to a storage location.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A primary data storage system for use in a computer network, the system comprising:
    an input/output port for receiving a block command packet conforming to a packet protocol, wherein the block command packet embodies one of a read block command and a write block command and transmitting a block result packet in reply to a block command packet;
    a data store system having at least one data store capable of receiving and storing one or more data blocks in response to a write block command and retrieving and providing one or more data blocks in response to a read block command;
    a data block processor configured to perform one or more operations relating to a data block and generate metadata relating to at least one of the one or more operations relating to the data block, wherein the metadata is determined at the time of reception of the data block based on a statistics database comprising data on hardware or software elements of the primary data storage system and the metadata includes a predetermined criticality whose determination does not require a measurement and allowed latency associated with each of one or more other operations being requested of the system at the time of the actual sending; and
    a replication processor configured to send one or more data blocks and metadata applicable to the one or more data blocks towards a target storage device that is capable of storing the data blocks and the metadata, the target storage device using a first archiving protocol, wherein the replication processor is capable of translating an archiving protocol used by the primary data storage system into the first archiving protocol used by the target storage device for the storage of the one or more data blocks on the target storage device, wherein, if the replication processor does not have prior knowledge of the use of the first archiving protocol by the target storage device, the replication processor conducts a negotiation with the target storage device to determine the first archiving protocol, wherein after a decision to send a translated one or more data blocks and metadata towards the target storage device has been made, the actual sending of the translated one or more data blocks and metadata is subject to a prioritization based on a combination of the predetermined criticality and the allowed latency associated with each of one or more other operations being requested of the system at the time of the actual sending.

2. The primary data storage system of claim 1, wherein:
    the replication processor is configured to identify a target storage device format prior to sending the one or more data blocks and the metadata towards the target storage device.

3. The primary data storage system of claim 1, wherein:
    the replication processor is configured to asynchronously send the one or more data blocks and metadata in a manner that likely satisfies a time constraint.

4. The primary data storage system of claim 1, wherein:
    the replication processor is configured to generate a primary metadata file identifying locations of metadata for each snapshot of a plurality of snapshots located in a target storage device.

5. The primary data storage system of claim 1, wherein:
    the replication processor is configured to archive one or more storage volume snapshots in which the snapshot constitute one of a full replication and a differential replication of the storage volume.

6. The primary data storage system of claim 1, wherein:
    the replication processor is configured to stream one or more snapshots and the metadata towards a target device a portion at a time to populate the archive.

7. The primary data storage system of claim 1, further comprising:
    a restore processor configured to retrieve metadata of a plurality of snapshots from a target storage device and to select a snapshot based on the retrieved metadata.

8. The primary data storage system of claim 7, wherein:
    the restore processor is configured to retrieve the selected snapshot from the target storage device and verify the integrity of the selected snapshot prior to restoring the snapshot on the data store.

9. The primary data storage system of claim 7, further comprising:
    a target storage device, wherein the target storage device comprises a portable storage device adapted to store one or more data blocks and metadata applicable to the one or more data blocks at a first geographical location, to be moved to a second geographical location that is different than the first geographical location, and to restore the one or more data blocks and metadata applicable to the one or more data blocks from the second geographical location.

10. The primary data storage system of claim 1, further comprising:
    a target storage device, wherein the target storage device comprises a portable storage device adapted to store a first of one or more data blocks and metadata applicable to the one or more data blocks at a first geographical location, to be moved to a second geographical location that is different than the first geographical location, and to store a second of one or more data blocks and metadata applicable to the one or more data blocks at the second geographical location.

11. The primary data storage system of claim 1, wherein:
    the first archiving protocol comprises an acceptable format for the storage of the one or more data blocks on the target storage device, the acceptable format further comprises one of: (a) a file system interface, (b) block device interface, (c) application programming interface, (d) a combination of file system interface, block device interface, and application programming interface, (e) at least two file system interfaces, (f) at least two block device interfaces, and (g) at least two application programming interfaces.

12. The primary data storage system of claim 1, wherein: the replication processor comprises an asynchronous replication processor for asynchronously sending the one or more data blocks and metadata applicable to the one or more data blocks towards the target storage device.

13. A primary data storage system for use in a computer network, the system comprising:
   an input/output port for receiving a block command packet that embodies one of a read block command and a write block command and transmitting a block result packet in reply to a block command packet;
   a data store system having at least one data store capable of receiving and storing one or more data blocks in response to a write block command and retrieving and providing one or more data blocks in response to a read block command;
   a data block processor configured to perform one or more operations relating to a data block and generate metadata relating to at least one of the one or more operations relating to the data block, wherein the metadata is determined at the time of reception of the data block based on a statistics database comprising data on hardware or software elements of the primary data storage system and the metadata includes a predetermined criticality whose determination does not require a measurement and allowed latency associated with each of one or more other operations being requested of the system at the time of the actual sending;
   an archive processor configured to identify at least one point in time copy of data blocks and related metadata stored in at least one data store as a snapshot; and
   a replication processor configured to adapt an archiving protocol of the primary data storage system into a first archiving protocol used by a target storage device by translating the archiving protocol of the primary storage device into the first archiving protocol, wherein, if the replication processor does not have prior knowledge of the use of the first archiving protocol by the target storage device, the replication processor conducts a negotiation with the target storage device to determine the first archiving protocol, and thereby create an adapted archiving protocol, and subsequently apply the adapted archiving protocol to a snapshot and thereby create an adapted snapshot and send the adapted snapshot towards a target storage device, wherein after a decision to send an adapted snapshot towards a target storage device has been made, the actual sending of the adapted snapshot is subject to a prioritization based on a combination of the predetermined criticality and allowed latency associated with each of one or more other operations being requested of the system at the time of the actual sending.

14. The primary data storage system of claim 13, wherein: the replication processor is configured to generate a primary metadata file identifying locations of metadata for each adapted snapshot of a plurality of adapted snapshots located in a target storage device.

15. The primary data storage system of claim 13, wherein: the replication processor is configured to archive one or more adapted snapshots in which each adapted snapshot constitutes one of a full replication and a differential replication of the snapshot prior to adaption.

16. The primary data storage system of claim 13, wherein: the replication processor is configured to stream one or more adapted snapshots towards a target storage device a portion at a time to populate the archive.

17. The primary data storage system of claim 13, further comprising:
   a restore processor configured to: (a) retrieve metadata for a plurality of adapted snapshots from a target storage device, (b) select an adapted snapshot from the target storage device based on the retrieved metadata, and (c) retrieve the selected and adapted snapshot from the target storage device and store the selected and adapted snapshot on the data store.

18. The primary data storage system of claim 17, wherein: the restore processor is configured to verify the integrity of an adapted snapshot prior to storing the adapted snapshot on the data store.

19. The primary data storage system of claim 13, wherein: the related metadata comprises a deduplication index containing references to deduplicated data for the snapshot, the deduplication index being usable to restore the deduplicated data.

20. A primary data storage system for use in a computer network, the system comprising:
   an input/output port for receiving a block command packet that embodies one of a read block command and a write block command and transmitting a block result packet in reply to a block command packet;
   a data store system having at least one data store capable of receiving and storing one or more data blocks in response to a write block command and retrieving and providing one or more data blocks in response to a read block command;
   a data block processor configured to perform one or more operations relating to a data block and generate metadata relating to at least one of the one or more operations relating to the data block, wherein the metadata is determined at the time of reception of the data block based on a statistics database comprising data on hardware or software elements of the primary data storage system and the metadata includes a predetermined criticality whose determination does not require a measurement and allowed latency associated with each of one or more other operations being requested of the system at the time of the actual sending;
   an archive processor configured to identify at least one point in time copy of data blocks and related metadata stored in at least one data store as a snapshot; and
   a replication processor configured to adapt an archiving protocol of the primary data storage system into a first archiving protocol used by a target storage device by translating the archiving protocol of the primary storage device into the first archiving protocol, wherein, if the replication processor does not have prior knowledge of the use of the first archiving protocol by the target storage device, the replication processor conducts a negotiation with the target storage device to determine the first archiving protocol, and thereby create an adapted archiving protocol, and subsequently apply the adapted archiving protocol to a portion of a snapshot and thereby create an adapted portion of the snapshot and send the adapted portion of the snapshot towards a target storage device, wherein after a decision to send an adapted portion of a snapshot towards the target storage device has been made, the actual sending of the adapted portion of a snapshot is subject to a prioritization based on a combination of the predetermined criticality whose determination does not require a measurement and allowed latency associated with each of one or more other operations being requested of the system at the time of the actual sending.

21. The primary data storage system of claim 20, wherein:
the replication processor is configured to archive one or more adapted portions of snapshots in which each adapted portion of a snapshot constitutes one of a full replication and a differential replication of the adapted portion of a snapshot prior to adaption.

\* \* \* \* \*